United States Patent [19]

Marshall et al.

[11] 4,187,363
[45] Feb. 5, 1980

[54] VINYL CHLORIDE POLYMERIZATION METHOD

[75] Inventors: Richard A. Marshall, Akron; Edwin S. Smith, Cuyahoga Falls; Frank A. Cich, Norton, all of Ohio

[73] Assignee: The Goodyear Tire & Rubber Company, Akron, Ohio

[21] Appl. No.: 909,221

[22] Filed: May 24, 1978

[51] Int. Cl.$^2$ ............................................. C08F 114/06
[52] U.S. Cl. ..................................... 526/208; 526/344; 528/487; 260/318 HA
[58] Field of Search ......................... 526/208; 528/487

[56] References Cited

U.S. PATENT DOCUMENTS

| | | | |
|---|---|---|---|
| 2,414,934 | 1/1947 | Denny | 526/208 |
| 4,060,677 | 11/1977 | Walker | 526/208 |

*Primary Examiner*—Harry Wong, Jr.
*Attorney, Agent, or Firm*—J.D. Wolfe

[57] ABSTRACT

A method of achieving chain transfer in the polymerization of a vinyl chloride monomer to polyvinyl chloride, utilizing aldehydes of 3 to 6 carbon atoms as the chain transfer agent and treating the polymerization mixture with an alkali bisulfite, such as sodium bisulfite or potassium bisulfite solution after the vinyl chloride monomer has been stripped from the polymerization mixture to obtain modified polyvinyl chloride having improved compounded physical properties.

2 Claims, No Drawings

VINYL CHLORIDE POLYMERIZATION METHOD

This invention relates to an improved method of polymerizing vinyl chloride monomer and to the resulting polymer. More particularly, this invention relates to the use of an aldehyde as a chain transfer agent in a polymerization recipe and sodium bisulfite to remove excess aldehyde to give an improved polymer.

Vinyl chloride monomer has been polymerized in both bulk and suspension systems using the so-called free radical catalyst and has been modified to control the resulting molecular weight of the polymer. One of the preferred modifying agents used heretofore in the production of modified polyvinyl chloride has been trichloroethylene (TCE). Recently it has become desirable to avoid the use of trichloroethylene in the polymerization of polyvinyl chloride and consequently considerable effort has been devoted to finding another chain transfer agent that could be used to replace trichloroethylene in the production of polyvinyl chloride.

This invention provides an improved chain transfer agent and a method of removing said chain transfer agent from polyvinyl chloride to yield a modified polyvinyl chloride having improved physicals relative to that produced with trichloroethylene as the chain transfer agent.

The nature of this invention is specifically directed to the use of the aliphatic aldehydes having less than about 6 and preferably 3 to 5 carbon atoms as the chain transfer agent during the polymerization of the vinyl chloride monomer and the removal of the residual aldehyde by treatment with sodium bisulfite to produce a modified polyvinyl chloride having improved stability and improved resulting physical properties when suitably compounded as for producing film. It should be appreciated that a typical polymerization recipe for producing polyvinyl chloride will be as set forth hereinafter:

| Recipe | Parts |
|---|---|
| Vinyl chloride (VCM) | 100 |
| H$_2$O | 142 |
| Suspending Agent | 0.45 |
| Catalyst | 0.15 |
| Sodium Bicarbonate | 0.15 |
| Chain transfer agent | 0.30 |

Normally, the water, the suspending agent, for example, polyvinyl alcohol or gelatin, and the sodium bicarbonate are added to the reactor and deaerated under a suitable vacuum usually at 26 inches of mercury at room temperature for approximately one hour, then the vinyl chloride monomer, chain transfer agents and catalysts, for example, t-butyl perpivalate or lauroyl peroxide are added and the mixture stirred and maintained at a temperature of approximately 45° to 70° C. and at autogenous pressures of approximately 90 to 160 pounds per square inch for 4 to 20 hours, at which time the polymerization is complete or has reached approximately equilibrium conditions. The reaction pressure is then reduced to atmospheric and the reaction mixture is freed of residual vinyl chloride monomer by the usual and customary stripping method such as heating the mixture to a higher temperature and decreasing the pressure sufficiently to maintain reflux for several hours.

In one method the resulting slurry is then removed from the reactor and centrifuged while being water washed to give a polymer when suitably dried that is suitable for commercial use.

In the following examples the polymerization of the vinyl chloride monomer uses either trichloroethylene or the aldehydes as chain transfer agents. It should be noticed that the aldehydes react with sodium bisulfite to give a polymer free of aldehyde odor and that exhibits improved stability.

The aldehyde causes an objectionable odor in the finished polyvinyl chloride (PVC). It is known that a sodium bisulfite solution can be used to react with excess aldehyde from the PVC. Unexpectedly it was found that addition of the bisulfite at the end of the polymerization before removing the excess monomer resulted in fixing the aldehyde-bisulfite complex in the polymer where it left an objectionable odor in the finished resin. It is an embodiment of this invention that the bisulfite be added after the stripping operation for removal of the vinyl chloride monomer (VCM) before recovery of the PVC from the slurry, to realize the optimum effect on the finished properties of the resin with respect to both properties and odor.

The results of these tests are set forth in Table 1 following:

TABLE 1

A COMPARISON OF TCE WITH VARIOUS ALDEHYDES AS CHAIN TRANSFER AGENTS

| Example No. | 8148 | 8149 | 8283 | 8258 | 8257 | 8286 | 8331 | 8339 | 8338 | 8287 | 8324 | 8327 | 8328 | 8330 | 8365 | 8326 |
|---|---|---|---|---|---|---|---|---|---|---|---|---|---|---|---|---|
| Charge | | | | | | | | | | | | | | | | |
| Additive | None | TCE$^a$ | PA$^b$ | BA$^c$ | IBA$^d$ | None | IBA | IBA | IBA | BZA$^e$ | None | IBA | IBA | IBA | IBA | GA$^f$ |
| Parts, pph monomer | — | 1.0 | 1.0 | 1.0 | 1.0 | — | 0.5 | 0.3 | 0.25 | 1.0 | — | 0.5 | 0.5 | 0.5 | 0.3 | 1.0 |
| NaHSO$_3$, pph monomer | — | — | | | — | | | | | | | 0.73 | 0.365 | 0.183 | .219 | |
| Reaction | | | | | | | | | | | | | | | | |
| Reaction Time, hrs | 10 | 13 | 17 | 11 | 15 | 9 | 12 | 11 | 12 | 14 | 7 | 6 | 10 | 11 | 9 | 13 |
| Conversion, % | 75 | 92 | 80 | 83 | 92 | 89 | 88 | 92 | 95 | 82 | 92 | 84 | 92 | 93 | 92 | 91 |
| Polymerization rate$^g$ #/hr | 1.29 | 1.21 | 0.81 | 1.30 | 1.05 | 1.57 | 1.16 | 1.32 | 1.25 | 0.92 | 2.08 | 2.22 | 1.46 | 1.34 | 1.62 | 1.10 |
| Product | | | | | | | | | | | | | | | | |
| Inherent viscosi- | | | | | | | | | | | | | | | | |

TABLE 1-continued

A COMPARISON OF TCE WITH VARIOUS ALDEHYDES AS CHAIN TRANSFER AGENTS

| Example No. | 8148 | 8149 | 8283 | 8258 | 8257 | 8286 | 8331 | 8339 | 8338 | 8287 | 8324 | 8327 | 8328 | 8330 | 8365 | 8326 |
|---|---|---|---|---|---|---|---|---|---|---|---|---|---|---|---|---|
| ty | 0.866 | .731 | .625 | .597 | .536 | .781 | .665 | .735 | .752 | .803 | .795 | .610 | .620 | .629 | .702 | .689 |

[a]TCE-trichloroethylene
[b]PA-Propionaldehyde
[c]BA-Butyraldehyde
[d]IBA-isobutyraldehyde
[e]BZA-Benzaldehyde
[f]GA-glutaraldehyde
[g]Polymerization rate is an approximation calculated by dividing the amount of total polymer produced by the total reaction time. pph-indicates parts per hundred parts.

From these experimental data it should be apparent that the aldehydes do produce polymerization rates that are essentially within the range of those obtained with trichloroethylene and the improved viscosities of the modified polyvinyl chloride compositions have superior physical properties, as shown by the results of Table 2.

As shown in Table 2, the difference between the average values of the physical properties of compounded polyvinyl chloride resin, i.e. plastisols containing PVC produced with isobutyraldehyde as chain transfer agent compared to plastisol containing trichloroethylene as chain transfer agent, is statistically significant at the 90 percent confidence level or higher.

Table 2

| Run No. | Chain Transfer Agent | Graves Tear (lbs/in) | Tensile at 350° F. (psi) | Elongation at 350° F. (%) |
|---|---|---|---|---|
| 1 | TCE[b] | 144 | 1290 | 215 |
| 2 | TCE | 175 | 1685 | 370 |
| 3 | TCE | 234 | 1915 | 357 |
| 4 | TCE | 230 | 1740 | 333 |
| 5 | TCE | 211 | 1640 | 313 |
| 6 | IBA[c] | 251 | 2110 | 400 |
| 7 | IBA | 264 | 1840 | 350 |
| 8 | IBA | 265 | 1950 | 355 |
| 9 | IBA | 244 | 1825 | 380 |
| $\bar{X}_{TCE}$[d] | | 198.8 | 1654 | 318 |
| $S_{TCE}$[e] | | ±38.5 | ±229 | ±61 |
| $\bar{X}_{IBA}$ | | 256.0 | 1931 | 371 |
| $S_{IBA}$ | | ±10.2 | ±132 | ±23 |
| Student t[f] | | 2.55 | 1.90 | 1.46 |
| Confidence level at which difference is significant (D.F=6) | | 97% | 95% | 90% |

Notes:
[a] Formulation used:

| Constituent | Parts |
|---|---|
| M-50 Blending Resin | 50 |
| Paste Resin | 50 |
| Dioctyl Phthalate | 55 |
| Epoxidized Soy Oil | 5 |
| Stabilizer | 2 |

[b]TCE = trichloroethylene.
[c]IBA = isobutyraldehyde.
[d]X is defined as the mean.
[e]S is defined as the standard deviation.

$$t_1 = (\bar{X}_{IBA} - \bar{X}_{TCE}) \left( \frac{N_{TCE} N_{IBA} (N_{TCE} + N_{IBA} - 2)}{N_{TCE} + N_{IBA}) (N_{IBA} S_{IBA}^2 + N_{TCE} S_{TCE}^2)} \right)^{\frac{1}{2}}$$

The Graves tear, tensile and elongation in Table 2 were run on modified polyvinyl chloride resin which had been compounded according to recipe or formulation set forth as footnote a in Table 2.

Generally, it is preferred to treat a polymerization mixture with a weak aqueous solution (about 1 to 10% by weight) of the alkali bisulfites where the representative alkali radicals are sodium, potassium and ammonium.

While certain representative embodiments and details have been shown for the purpose of illustrating the invention, it will be apparent to those skilled in this art that various changes and modifications may be made therein without departing from the spirit or scope of the invention.

What is claimed is:

1. A method of achieving chain transfer in a suspension polymerization of a vinyl chloride monomer to a polyvinyl chloride product comprising polymerizing said monomer in the presence of a peroxide catalyst and aldehydes of 3 to 6 carbon atoms as the chain transfer agent and treating product with an alkali bisulfite solution after the vinyl chloride monomer has been removed to obtain the polyvinyl chloride.

2. The method of claim 1 wherein the aldehyde is isobutyraldehyde and the alkali bisulfite is sodium bisulfite.

* * * * *